United States Patent [19]
Zybailo et al.

[11] 4,404,547
[45] Sep. 13, 1983

[54] DATA INPUT KEYBOARD

[76] Inventors: Valentin P. Zybailo, ulitsa Ya.Kolasa, 62, kv.20; Anatoly N. Kniga, ulitsa Volgogradskaya, 1, korpus 3, kv. 41; Ljudmila E. Kosyan, Leninsky prospekt, 104, kv. 28; Valentin P. Rudenko, ulitsa Knorina, 11/2, kv. 95; Sergei A. Poltaev, 1 Junoshesky pereulok, 18/60, all of Minsk, U.S.S.R.

[21] Appl. No.: 270,417

[22] Filed: Jun. 11, 1981

[51] Int. Cl.[3] ........................ G06F 3/02; H01H 19/58; H01H 21/78

[52] U.S. Cl. .......................... 340/365 R; 200/11 TW; 340/365 VL; 400/485

[58] Field of Search ........ 340/365 R, 365 S, 365 VL; 364/200, 900; 200/5 R, 5 A, 5 B, 11 TW; 400/485

[56] References Cited

U.S. PATENT DOCUMENTS 3,760,409 9/1973 Ruben et al. ................. 340/365 VL
4,005,388 1/1977 Morley et al. ................... 340/365 S
4,120,044 10/1978 Harayda .......................... 340/365 S

FOREIGN PATENT DOCUMENTS 2144094 2/1973 France .
676983 7/1979 U.S.S.R. .

*Primary Examiner*—James J. Groody
*Attorney, Agent, or Firm*—Lilling & Greenspan

[57] ABSTRACT

Disclosed is a data input keyboard comprising a plurality of keys which are arranged on a panel in the form of a matrix of "m" lines, "n" columns and each of the keys being provided with a reset member and a pusher coupled to a contact pair; a switch means provided with a plurality of contact pairs; and a rotation transfer mechanism incorporating an input shaft with a rotation member and "m" output shafts and mechanically coupled to the contact pairs of the switch means. A body of the contact pairs of all the keys defines an accurate channel of forming the codes of the characters assigned by the keyboard and a body of the contact pairs of the switch means defines a rough channel of forming the aforesaid codes. Each of the keys has the shape of a cylinder with faces on the peripheral surface thereof carrying the inscriptions of the characters, and is made rotatable around the axis of the cylinder. The keys of each of the "m" lines of the matrix are mounted on one of the output shafts of the rotation transfer mechanism so that each of the keys is capable of shifting toward its pusher.

9 Claims, 10 Drawing Figures

DATA INPUT KEYBOARD

FIELD OF THE INVENTION

The present invention relates generally to digital electronic computer input devices and, more specifically, to data input keyboards.

The present invention can be utilized in devices for the input of a variety of instructions and programs in automatic control and data processing systems, for example, in computerized experimental research facilities, in vehicle-borne computer systems, in microcalculators and so forth.

The present invention can be used to the utmost advantage in such data input devices when it becomes necessary in the course of operation to perform frequent changes in the nomenclature of input characters.

BACKGROUND OF THE INVENTION

At the present time, while solving various problems on electronic computers, it is required in increasing frequency to accomplish the flexible input of problem-related data from one operator's position, for example, in cases when the computer system is used on flying vehicles, in the operation of microcalculators and the like. In such cases the data input keyboard should enable the input of a few different alphabets or sets of characters and formatized instructions individually required by each of the users solving problems of a different nature. If, however, the characters required by different users for the solution of their specific problems do not coincide partially or completely, then the number of these characters tends to increase and, accordingly, so does the number of the keys in the keyboard. The present invention is directed at the provision of a universal keyboard for the input of data into a computer system, allowing the input of characters of a few alphabets and a simple change of the alphabets with a minimum number of keys in the keyboard.

DESCRIPTION OF THE PRIOR ART

Known in the prior art is a computer data input keyboard (see; for example, U.S.S.R. Inventor's Certificate No. 676983 issued July 30, 1979) comprising a plurality of keys mounted in the openings of a panel in rows, and each of which is provided with a flexible reset member and a pusher coupled to a contact pair. Each of the keys is capable of rotation around the axis mounted at one of the ends thereof, the axes of the odd keys being mounted at the other end of the keys of the same row.

However, in the above-described data input keyboard the number of the keys is equal to the number of the characters of one or a few chosen alphabets and, therefore, when it is necessary to use a large number of characters, the keyboard is provided with a large number of keys and becomes objectionably cumbersome. Furthermore, in the construction of a data input device using such a keyboard, it is required to make a fairly large number of parallel-consecutive couplings from the contact pairs of the keys to the coder of this device, which makes it indispensable to employ a considerable amount of electronic hardware. This results in impairing the operational reliability of the data input device and in increasing its cost. Known in the prior art is another data input keyboard (see, for example, French Pat. No. 2,144,094 issued Feb. 9, 1973) comprising a plurality of keys which are mounted in rows and each of which is provided with a flexible reset member and a pusher coupled to a contact pair. This keyboard also comprises two special keyboard register selectors or, in other words, means for selection of the alphabet of the characters assigned by the keyboard. Due to this, with the help of each key it is possible to assign two different characters, while with the help of the entire keyboard it is possible to assign two different character alphabets.

However, despite the fact that the total number of the keys in this prior art keyboard is reduced by a half, as compared to that described hereinabove, this keyboard does not allow the use of a few alphabets of characters with a relatively small total number of keys.

Known in the prior art is still another data input keyboard (see, for example, U.S. Pat. No. 4,005,388 issued Jan. 25, 1977) incorporated as a part in a manual terminal ensuring user-computer conversational mode and comprising a plurality of keys which are arranged on a panel in the form of a matrix and each of which is provided with a flexible reset member and coupled to a contact pair. In this keyboard each of the keys enables the assignment of four different characters or, otherwise, four different data levels, all of the characters which can be assigned by any of these data keys being marked on its frontal surface whereon the operator presses in operation with the keyboard. The above keyboard also comprises a switch means incorporating special elements with contact pairs for controlling a level of shifting and ensuring the selection of an alphabet or a keyboard register. It can be stated that the entire body of the contact pairs of all the keys of the keyboard constitutes an accurate channel of forming the codes of the characters assigned by this keyboard, while the entire body of the contact pairs of the switch means of the keyboard constitutes a rough channel of forming the codes of these characters.

However, despite the fact that this prior art data input keyboard enables, due to the provision of the switch means, the use of a few alphabets with a relatively small total number of the keys and control elements, it is undoubtedly inconvenient when used in certain cases. This stems, firstly, from the fact that upon the input of the required characters into the computer system with the help of such a keyboard, the operator should manipulate simultaneously both the data keys and the keyboard register selectors. Secondly, due to that upon each of the data keys there are several characters which can be assigned, the operator should exercise continuous supervision over the correctness of the input of the required characters. In this process the operator, on the one hand, is to remember all the time in which alphabet or on what keyboard register are located the characters or instructions to be introduced and, on the other hand, he is to watch all the time the position of the keyboard register selectors and/or the readings of a display attached to the keyboard. As a result, in the process of data input the operator's attention is distributed among a few operational keyboard elements, while due to the provision in the keys of the characters being not assigned at the moment, the operator continuously receives too much unnecessary information. This complicates and inconveniences the operator's manipulations, which, while using the above keyboard, results in impairing the reliability of data input into the computer system.

It should be also noted that the provision of a few separate keyboard register selectors in this keyboard makes its design unnecessarily complex.

SUMMARY OF THE INVENTION

An object of the present invention is to provide a data input keyboard enabling the use of a few different alphabets with a minimum number of keys therein.

Another object of the present invention is to provide a data input keyboard of the above-mentioned type having a comparatively small size.

Still another object of the present invention is to provide a data input keyboard of the above-mentioned type ensuring the improved reliability of data input into the computer system.

Still another object of the present invention is to enhance the convenience of operation for the operator handling the data input keyboard.

Having the foregoing and other objects in view, there is provided a data input keyboard comprising a plurality of keys which are arranged on a panel in the form of a matrix of "m" lines and "n" columns and each of which is provided with a flexible member and a pusher coupled to a contact pair, a body of the contact pairs of all the keys serving as an accurate channel of forming the codes of the characters assigned by means of the aforesaid keyboard; and a switch means provided with a plurality of contact pairs, in each of which one of the contacts is movable, and serving for switching a rough channel of the codes of the aforesaid characters defined by the contact pairs of the switch means. According to the invention, each of the keys has the shape of a cylinder with faces on the peripheral surface thereof carrying the inscriptions of the characters assigned, and is made rotatable around the longitudinal axis of the cylinder. The keys of each of the "m" lines of the matrix are mounted on one of the output shafts of a rotation transfer mechanism, whose input shaft is provided with a rotation member and which is coupled to the movable contacts of the aforesaid switching means, each of the keys being mounted on the output shaft so as to be capable of shifting toward its pusher.

Such an arrangement of the data input keyboard enables upon a change of the alphabet to switch in synchronism all the contact pairs of the rough channel of forming the codes of the characters assigned and to turn concurrently therewith all the keys of the keyboard for changing the inscription of the characters in accordance with the alphabet established.

According to one embodiment of the proposed data input keyboard, each of the keys is made in the form of a hollow cylinder and mounted on the output shaft of a rigid structure by means of two tapered helical springs which are arranged inside the hollow cylinder along the axis of the output shaft so that they enclose the output shaft and face each other with their apexes; and each of which is rigidly secured by its one portion to the output shaft and by its other portion to the inner surface of the hollow cylinder.

Such an arrangement of the data input keyboard ensures reliable performance and an extended service life of these keys.

According to another embodiment of the proposed data input keyboard, each of the keys is made in the form of a cylinder with an axial through opening and is rigidly secured on the output shaft of a flexible and resilient structure serving as the flexible member and extending through the axial through opening of the cylinder.

Such an arrangement of the data input keyboard simplifies the manufacture of the keyboard. A suitable flexible and resilient shaft of the desired dimensions can be easily chosen from the available range of such shafts produced commercially.

The switch means of the proposed data input keyboard can be made in the form of a multipositional rotary switch which has "p" positions and a number of directions equal to the value of the square root of the value "p", rounded to an integer, where "p" is the number of faces of the key. The rotary portion of the multipositional rotary switch with the movable contacts of the contact pairs is fitted on the input shaft of the rotation transfer mechanism, while the nonrotary portion thereof with the stationary contacts of the contact pairs is secured to the panel of the keyboard.

Such an arrangement of the switch means simplifies the keyboard design due to the possibility of using as the multipositional rotary switch a conventional device, such devices coming in a considerable number of types which are mass-produced commercially.

The switch means of the proposed data input keyboard can be also made comprising "p" cams, each of which is mounted on one of the output shafts of the rotation transfer mechanism so as to be capable of contact by its lobe with the movable contact of one of the contact pairs of the switch means, the aforesaid cams being mounted on the input shaft so that the lobes of the two adjacent cams are displaced circumferentially with respect to each other by 360/p degrees, where "p" is the number of faces on each key.

Such an arrangement of the switch means allows in the keyboard structure one type of the elements carrying the contact pairs and to unify thereby the units of the keyboard.

BRIEF DESCRIPTION OF THE DRAWINGS

The foregoing and other objects as well as salient features and advantages of the present invention will become more apparent from the following consideration of a detailed description of the invention given hereinbelow, with reference being made to the accompanying drawings, in which.

Figure 1:
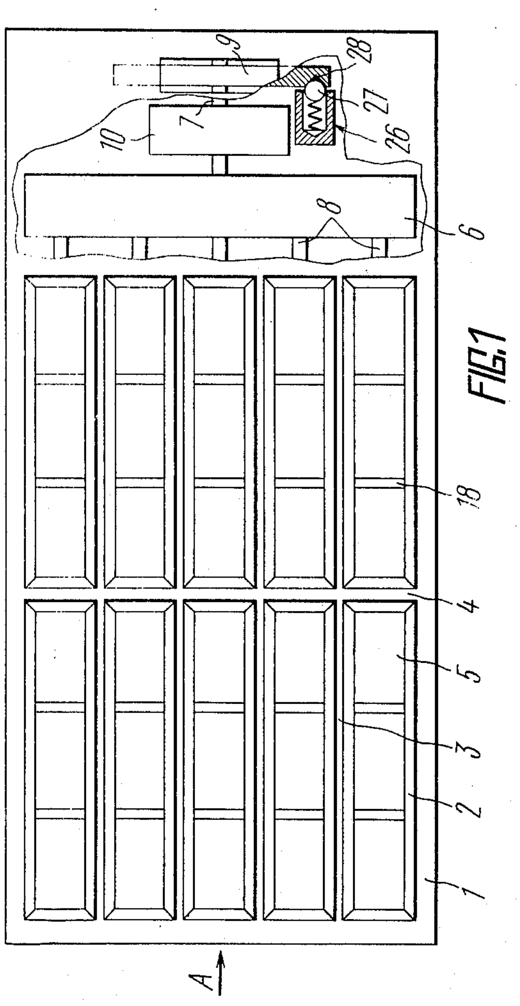
FIG. 1 is a plan view of a simplified form of a data input keyboard, according to the invention.

It should be emphasised that the drawings accompanying the description are presented schematically and serve merely for the purposes of elucidating the present invention without any limitations whatsoever imposed on the dimensions of the elements incorporated as a part of the proposed data input keyboard, or the dimensional relationship of these elements and so forth. In different drawings the same structural elements are designated by the same reference numerals.

DETAILED DESCRIPTION OF THE INVENTION

Upon referring to FIG. 1 there will be seen that the proposed data input keyboard for use, for example, in the input device of an electronic computer mounted aboard a flying vehicle, comprises a panel 1 with apertures 2 which are formed by longitudinal ribs 3 and transverse ribs 4 and inside of which keys 5 are disposed. The keys 5 are arranged on the panel 1 in the form of a matrix including five lines and six columns, that is, in each of the lines of the matrix there are six keys 5 and on all the keyboard there are thirty keys 5. The lines of the keys 5 are separated from one another by the aforesaid longitudinal ribs 3. The keyboard also comprises a schematically shown rotation transfer mechanism 6, whose construction will be described hereinbelow, which has an input shaft 7 and output shafts 8, the output shafts 8 being arranged in one plane and their number being equal to the number of lines in the matrix of the keys 5, that is, to five. On the input shaft 7 of the rotation transfer mechanism 6 there is mounted a rotation member 9 of this shaft representing a conventional handwheel; on each of the output shafts 8 there are mounted the keys 5 of one line of the matrix. The rotation transfer mechanism 6 is also coupled to a schematically shown switch means 10, whose construction will be described hereinbelow, which is mounted in this specific case on the input shaft 7 of the aforesaid mechanism.

Figure 2:
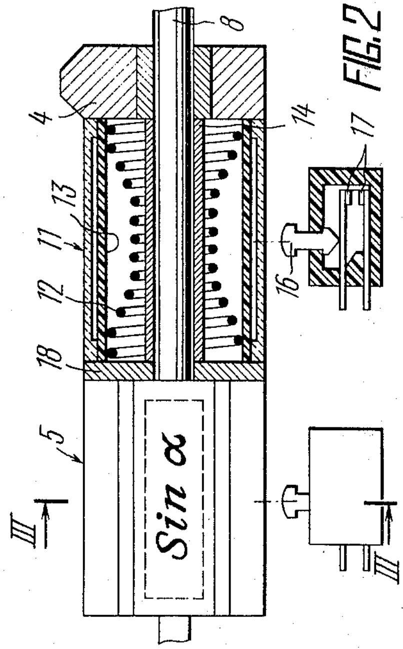
FIG. 2 is an enlarged plan view, showing two adjacent keys of one line of the matrix which are fitted on the rigid shaft, one of which being shown in longitudinal section, according to the invention.
Figure 3:
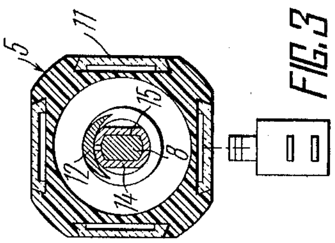
FIG. 3 is a view in cross section along the line III—III of FIG. 2.

Upon referring now to FIGS. 2 and 3, each of the keys 5 has the shape of a cylinder with four faces 11 on its peripheral surface, on each of which is marked the inscription of one of the characters which can be assigned by means of the keyboard described. One of such characters applied to the surface of the face 11 by engraving is shown in FIG. 2. It is understood that each of the keys 5 may also have a different number of faces 11, but always equal for all of the keys, depending on the prearranged size of the keyboard and on the specific total number of the characters to be set into a specific computer system, that is, up to eight.

In the embodiment of the key 5 illustrated in FIGS. 2 and 3, the key 5 is made, according to the invention, in the form of a hollow cylinder and is mounted on the output shaft 8 (FIG. 2) of a rigid structure by means of, in this specific case, two tapered helical springs 12 which serve as a resilient reset member of the key 5. The tapered helical springs 12 are mounted inside the hollow cylinder so that they are disposed along the axis of the output shaft 8, face each other with the apexes thereof and each of them encloses the output shaft 8. The wide "bottom" portion of the tapered springs 12 adjoins the inner surface 13 of the hollow cylinder; and, the narrow "top" portion thereof adjoins a tube 14, which in cross section has a shape corresponding to the shape of the cross section of the output shaft 8 provided with longitudinal flats 15 (FIG. 3) and which, therefore, snugly adjoins the output shaft 8. The respective turns of these springs are secured by means of a sizing agent to the points of contact on the tapered springs 12 (FIG. 2) with the inner surface 13 and the tube 14. Due to this the tapered springs 12 are rigidly secured to the output shaft 8 and at the same time to the inner surface 13 of the hollow cylinder of the key 5. The fitting of the key 5 on the output shafts 8 by means of the tubes 14 facilitates the assembly of the data input keyboard and, if required, ensures a simple replacement of the keys 5.

Each key 5 is provided with a pusher 16 which is capable of contact with the key and coupled to a contact pair 17. In a particular case, a microswitch with projecting push button can be used as the contact pair 17 with the pusher 16. The two adjacent keys 5 of each line of the matrix are interposed by separating washers 18. The abovedescribed attachment of the keys 5 to the output shaft 8 enables each key 5 to shift freely toward its pusher 16. The contact pairs 17 of all the keys 5 of the keyboard constitute an accurate channel of forming the codes of the characters being assigned by means of the keyboard. This channel will be described in detail hereinbelow.

The arrangement of the keys 5 according to the embodiment shown in FIG. 2 and in FIG. 3 is recommended for use wherever it is required to fabricate a keyboard of comparatively small overall dimensions with a sufficiently large number of keys 5, that is, when the keys 5 are to be fairly small in size. While citing examples, one may point to the use of a keyboard with such keys in microcalculators, vehicle-borne electronic computer input devices, etc., where use is made of simple and brief input characters.

Figure 4:
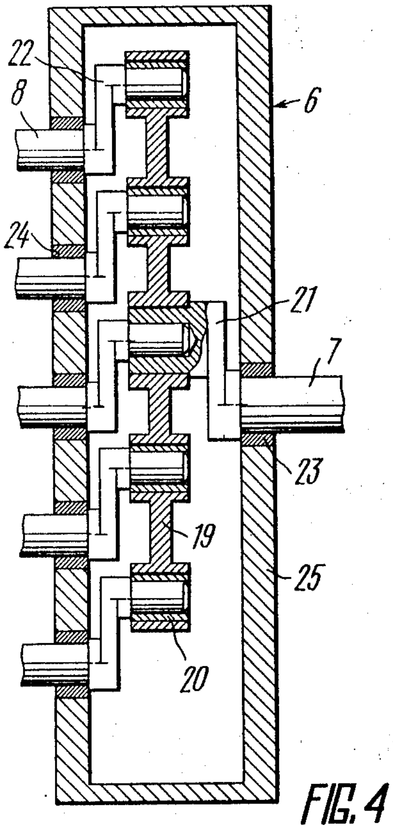
FIG. 4 is a top, sectional view, showing the construction of the rotation transfer mechanism.

The rotation transfer mechanism 6 (FIG. 1) may include a crank mechanism and incorporates a common connecting rod 19 (FIG. 4) with bearings 20, inside of which there are mounted a crank 21 of the input shaft 7 and cranks 22 of the output shafts 8, the input shaft 7 of the mechanism 6 being mounted in a bearing 23, while the output shafts 8 being mounted in bearings 24 secured in a frame 25. It is understood that in the rotation transfer mechanism 6 there may be used as well other types of mechanical couplings, such as sets of pinions, small wires, steel bands and so forth. The rotation transfer mechanism 6 also comprises a lock 26 (FIG. 1) of the rotation angle of the input shaft 7 which in this particular case equals to 90 degrees. The lock 26 is made in the form of a spring-loaded ball 27 capable of entering into one of the depressions 28 provided circumferentially at the inner end face of the rotation member 9. The locations of the depressions 28 on the rotation member 9 are chosen so that in any locked position of this member only one face 11 of all the keys 5 faces the operator, the lock 26 preventing spontaneous rotation of the keys 5.

Due to the introduction of the rotation transfer mechanism 6 into the data input keyboard described and owing to the movable attachment of the keys 5 on the output shafts 8 of this mechanism, the keys 5 are capable of rotating about their axes together with the output shafts 8 and also performing translational displacement in the radial direction with respect to these shafts.

Figure 5:
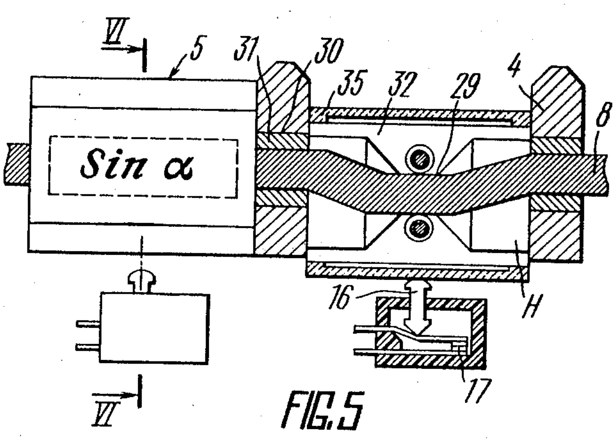
FIG. 5 is a view similar to FIG. 2, but showing another embodiment of the keys fitted on the flexible and resilient shaft, according to the invention.
Figure 6:
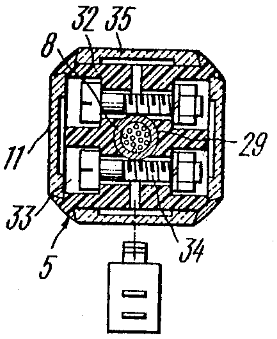
FIG. 6 is a view in cross section along the line VI—VI of FIG. 5.

In the embodiment of the key 5 shown in FIG. 5 and FIG. 6 the key is made, according to the invention, in the form of a cylinder with an axial through opening 29 (FIG. 5) and is rigidly secured on the output shaft 8 passed through this opening. Each of the output shafts 8 represents in this case a flexible and resilient structure and acts as the resilient reset member of the key 5. Structurally, this flexible and resilient output shaft 8 is made of a plurality of thin steel wires around which are wound a few identical wires in opposite directions. Such a wire shaft exhibits a sufficiently large margin of strength upon twisting. The output shaft 8 passes through openings 30 made in the transverse ribs 4 and is mounted in bushings 31 embedded in the openings 30 and serving as bearings. Under each of the keys 5, similarly as in the embodiment shown in FIG. 2 and FIG. 3, there is arranged one contact pair 17 which is also mechanically coupled to the key 5 by the pusher 16. Due to that in each of the keys 5 there are provided at the end portions tapered depressions "H" and to that the output shaft 8 freely extends through the bushings 31, the key 5, according to this specific embodiments, is also capable of shifting toward its pusher 16.

Each of the keys 5 is formed by two identical semicylindrical portions 32 (FIG. 6) which are provided with semicylindrical grooves making up the axial through opening 29 and lateral depressions 33 with respective openings, inside which there are mounted the screws 34 of screw pairs providing the fastening of the semicylindrical portions 32 into one integral structure as well as the close fitting of the key 5 on the output shaft 8. On each of the faces 11 of the keys 5 there is mounted a designation strip 35 with engraved character inscriptions. To facilitate a partial or complete conversion of the keyboard to another alphabet system the designation strips 35 can be made interchangeable and in this case they are located either in longitudinal or transverse slots made in the faces 11 with the cross section, for example, of a swallow-tail type (as shown in the drawing), or are secured to the key 5 by means of suitable screws. Besides the engraved designation strip 35 in this case there may be also used a paper designation strip mounted on the key 5 under a thin plate of transparent material. In the simplest case the designation strip 35 may be secured to the face 11 of the key 5 by means of one or another sizing agent.

The arrangement of the key 5 and their attachment on the output shafts 8 according to the embodiment shown in FIG. 5 and FIG. 6 ensures a simple keyboard assembly procedure. This arrangement is recommended for use wherever no considerable limitations as to overall dimensions are imposed on the keyboard and when it is required to employ the keys 5 of a sufficiently elongated form in order to freely accommodate a comparatively long body of characters of formalized instructions. While citing examples, one may point to the use of the keyboard with such keys 5 in manufacturing process automatization facilities.

Figure 7A:
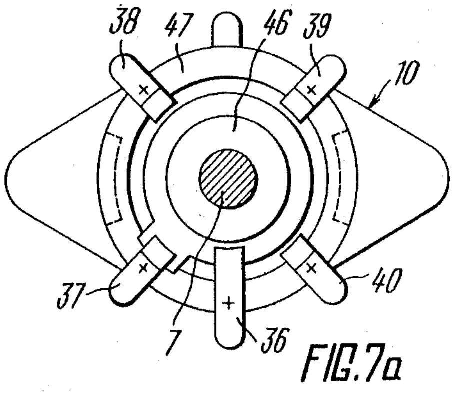
FIGS. 7 and 7*a* are views, showing the switch means of the data input keyboard, which represents a multipositional rotary switch of a wafer type, according to the invention.
Figure 7:
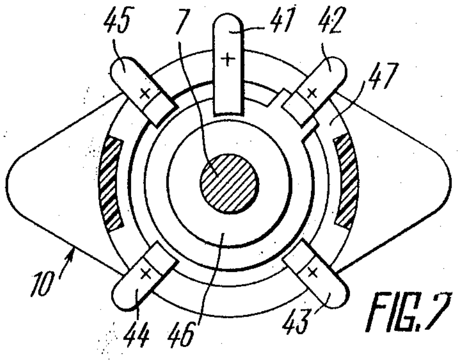

The switch means 10 (FIG. 1) in the embodiment shown in FIGS. 7 and 7*a* represents a multipositional rotary switch of a wafer type which in the keyboard described has two directions and four positions, the number of the positions of the switch being equal to the number of faces 11 (FIG. 3) provided on each key 5. With a different number of faces 11 on each key 5, equal, for example, to "p", the number of positions of the switch should be also equal respectively "p". The number of directions in the switch in this case will be equal to the value of the square root of the value "p", rounded to an integer. Thus, for example, for a number of faces 11 lying in the range from 5 to 8, the number of the directions of the switch must be equal to three. In the above multipositional wafer switch use is made of, as shown in FIGS. 7 and 7*a*, two wafers, each of which ensures one direction and has its fixed positions spaced circumferentially apart at 90 degrees.

The contact pairs of the switch means 10 associated with the first direction of the switch are formed by a movable contact 36 and four stationary contacts 37, 38, 39 and 40 of one wafer, while the contact pairs of this means associated with the second direction are formed by a movable contact 41 and four stationary contacts 42, 43, 44 and 45 of the other wafer. The rotary portions 46 of the switch wafers, carrying the movable contacts 36 and 41 of the contact pairs of the switch means 10 are mounted on the input shaft 7 (FIG. 1) of the rotation transfer mechanism 6 and can be rotated together with this shaft, while the nonrotary portions 47 (FIGS. 7 and 7*a*) of the switch wafers, carrying the stationary contacts 37–40 and 42–45 are secured to the panel 1 (FIG. 1) of the data input keyboard. The contact pairs of the switch means 10 provided by the aforesaid movable and stationary contacts upon rotation of the input shaft 7 constitute a rough channel of forming the codes of the characters assigned by the keyboard. This channel will be described in detail hereinbelow. It is understood that, instead of the multipositional rotary switch of a wafer type in this specific embodiment of the switch means 10, there may be also used rotary switches of other types, such as drum, helical and other similar types. The rotary switch of a wafer type can be recommended for use in comparatively simple and unexpensive data input key-board.

Figure 8:
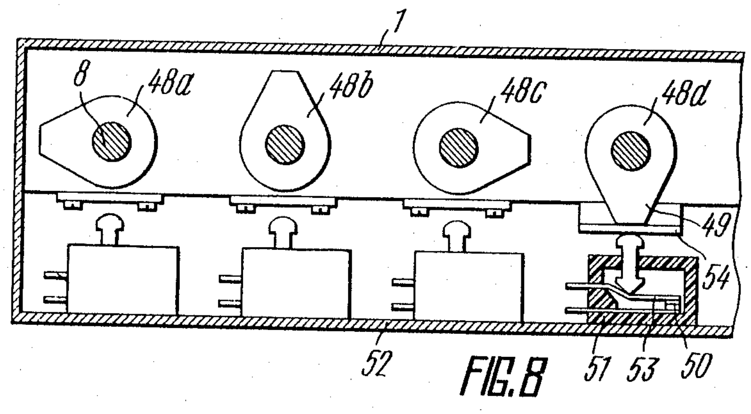
FIG. 8 is a view of another embodiment of the switch means of the data input keyboard which comprises cams, according to the invention.

The switch means 10 in the embodiment shown in FIG. 8 incorporates cams 48 with a lobe 49, the number of these cams being equal to the number of faces 11 of the keys 5 in the matrix, that is, to four. Each of the cams 48 is mounted on one of the output shafts 8 of the rotation transfer mechanism 6 and, being rigidly secured on this shaft, is capable of making contact by its lobe 49 with one of the contact pairs 50 of the switch means 10, located adjacent to these cams. Each of the contact pairs 50 is arranged in a protective casing 51 mounted at the bottom 52 of a keyboard enclosure. The lobe 49 of each cam 48 is in contact with the movable contact 53 of the contact pair 50 via a spring 54 which transfers the pressure of the lobe 49 onto this contact strictly vertically.

The cams 48 are mounted on the output shafts 8 so that the lobes 49 of the two adjacent cams are displaced circumferentially with respect to each other by 90 degrees, the value of this angle is determined, just as the number of the positions of the rotary switch in the above-described embodiment of the switch means 10, by the number of faces 11 provided on each key 5. With a different number of faces 11 on each key 5, equal, for example, to "p", this angle will be respectively equal to 360/p degrees. As may be seen from FIG. 8, the lobe 49 of the cam 48*b* is displaced by 90 degrees both with respect to the lobe 49 of the cam 48*a* and with respect to the lobe 49 of the cam 48*c*. The lobe 49 of the cam 48*c* is in turn displaced by 90 degrees with respect to the lobes 49 of the cams 48*b* and 48*d*. At that, however, the lobes 49 of not all of the cams 48 are in contact with the contact pairs 50 with one and the same position of the output shafts 8. Thus, in the position shown in the drawing it is only the lobe 49 of the cam 48*d* which is in contact with one of the contact pairs 50 keeping it in a closed state.

The cams 48 can be mounted on the output shafts 8 in the keyboard either on the edges of the field of the keys 5 (FIG. 1), or, if the field of the keys 5 is broken in the keyboard into two subfields, between these subfields. The specific location of the cams 48 is determined by the chosen keyboard arrangement. In the proposed keyboard it is most convenient to locate the cams 48 along the left (according to the drawing) edge of the field of the keys 5, and in this case FIG. 8 represents a view which might be seen, if the switch means 10 was made according to the embodiment described, in the direction of the arrow A of FIG. 1.

The data input keyboard, wherein use is made of the switch means 10 which has been now described hereinabove, features improved operational reliability since in this keyboard one and the same element can be used as any of the available contact pairs, for example, a microswitch with a large number of operations. Therefore, the keyboard with the above switch means 10 can be recommended for use in all important cases wherever high reliability is involved, for example, in flying vehicle computer system output devices.

Figure 9:
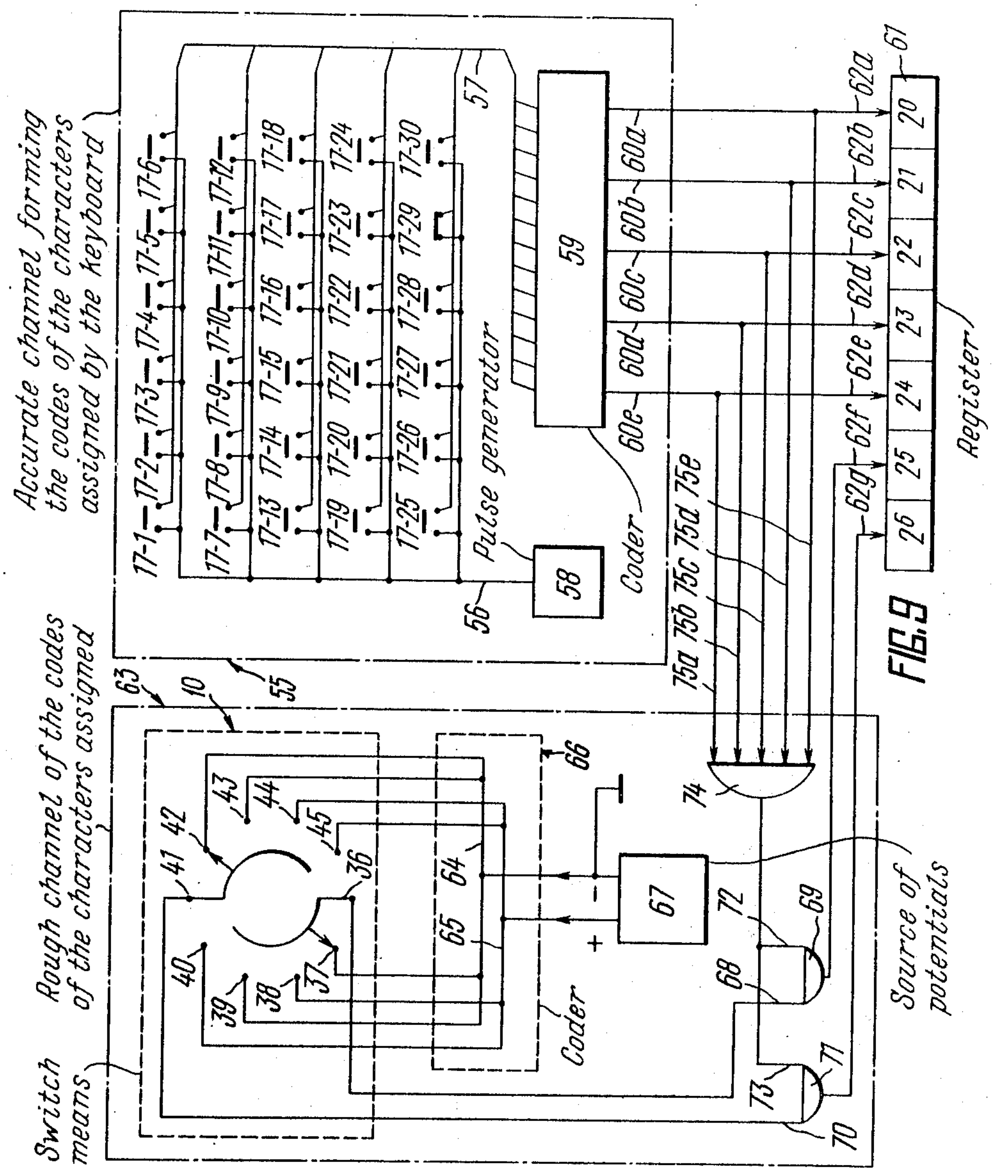
FIG. 9 is a wiring diagram of the contact pairs of the switch means of the data input keyboard.

Shown in FIG. 9 is a wiring diagram of the contact pairs 17 of the keys 5 and of the contact pairs of the switch means 10 inside the keyboard, as well as the connections of these contact pairs with the external electronic hardware. As seen from this diagram, the contact pairs 17 controlled by the keys 5 and defining an accurate channel 55 forming the codes of the characters assigned by the keyboard represent a matrix field of the contact pairs having the internal numbering with numbers from 17-1 to 17-30. In the field of the contact pairs 17 one of the contacts of each of these pairs is connected to a common tying bus 56, while the other contact of each of the pairs of one line of the matrix is connected to a separate output conductor, and all these separate conductors are brought together into a schematically shown bundle 57 of the output conductors of the keyboard. The accurate channel 55 of forming the codes also incorporates a pulse generator 58 connected to the common tying bus 56, and a coder 59 whose inputs are connected to the output conductors of each of the contact pairs 17 and whose outputs 60 are connected to the digital binary register 61 of the code of the characters assigned. At that, specifically, the outputs 60*a*–60*e* of the coder 59 are connected respectively to the inputs 62*a*–62*e* of the register 61. In other words, the outputs of the accurate channel 55 are connected to the inputs of the cells of the five lower-order stages of the register 61.

As was stated hereinabove, the contact pairs of the switch means 10 (FIG. 1) controlled by the rotation member 9 of the rotation transfer mechanism 6 define a rough channel of the codes of the characters assigned, the rough channel being designated in FIG. 9 by a reference numeral 63. In FIG. 9 the switch means 10 is shown, so as to simplify the description of the structure and operation of the rough channel 63, in the form of the embodiment with the wafer switch provided with the movable contacts 36 and 41 and the stationary contacts 37–40 and 42–45 of the contact pairs of this means. The stationary contacts 37 and 39 of one direction of this switch means and the stationary contacts 43 and 42 of its other direction are connected to an integrating line 64; and, the stationary contacts 38 and 40 of one direction and the stationary contacts 44 and 45 of the other direction are connected to an integrating line 65. Such a connection of the aforesaid stationary contacts of the switch means 10 defines a coder 66 of the rough channel 63. The integrating lines 64 and 65 are connected to a source 67 of potentials, the line 64 being connected to a low potential terminal of this source (zero volts) designated by a sign "minus", while the line 65 is connected to a high potential (+4 volts) designated by a sign "plus".

The movable contact 36 of the switch means 10 is connected to the input 68 of a logic AND element 69, while the movable contact 41 is connected to the input 70 of a logic AND element 71. The other inputs 72 and 73 of these logic elements 69 and 71, respectively are put in parallel and connected to the output of a logic circuit 74, whose inputs 75*a*–75*e* are connected respectively to the outputs 60*a*–60*e* of the coder 59 of the accurate channel 55 of forming the codes. The outputs of the logic elements 69 and 71 are connected respectively to the input 62*f* and to the input 62*g* of the register 61 of the code formed; that is, in other words, the outputs of the rough channel 63 are connected to the inputs of the cells of the two higher-order stages of the register 61.

Due to the above-described arrangement of the rough channel 63 and accurate channel 55 of forming the codes of the characters assigned, by means of the proposed keyboard, there can be introduced, in the general case, the codes $N = m \cdot n \cdot p$ of characters, where N is the total number of input characters, m is the number of lines in the matrix, n is the number of columns in the matrix, and p is the number of operational faces 11 of the key with the inscriptions of the characters. In the specific case under consideration where $m=5$, $n=6$ and $p=4$ the proposed keyboard enables the codes of 120 characters to be inserted into the computer system.

The data input keyboard of the present invention operates as follows.

Prior to the commencement of data input into the computer system equipped with the proposed keyboard, the operator chooses the desired alphabet of the characters assigned, appropriately positioning the rotation member 9 (FIG. 1). In the course of rotation by the operator of the member 9 the input shaft 7 of the rotation transfer mechanism 6 is caused to rotate, and rotation of the input shaft 7 (FIG. 4) is transmitted to its crank 21 which moves the common rod 19 of this mechanism. From the common rod 19, motion is transmitted via the cranks 22 to the output shafts 8, each of which is rotated strictly through the same angle as was the member 9 (FIG. 11) (that is, in this particular case, through 90°). In synchronism with the output shafts 8 the keys 5 fitted thereon are rotated. As soon as the required characters have emerged on the faces of the keys 5 and are visible in the apertures 2, the operator ceases rotation of the member 9 and the keyboard is ready for assigning the characters whose inscriptions the operator is observing in the apertures 2. The chosen position of the member 9 and, hence, the position of the keys 5 with the required characters is reliably fixed at this stage by the lock 26.

When pressing on the surface of the face 11 (FIG. 2) of one or another key 5 visible in the aperture 2, the tapered springs 12 are deformed radially, the body of the key 5 is displaced downward (according to the drawing) and transmits motion to the pusher 16 associated with this key, which closes the contact pair 17 coupled thereto. Upon removal of the external action, the key 5 recovers its initial position by the force of the tapered springs 12, while the contact pair 17 opens. As a result of closing and opening of the contact pair 17 there is generated a suitable electric signal.

In the embodiment of the key 5 shown in FIG. 5 and FIG. 6 during pressing on the face 11 of the key 5 visible to the operator, it is now the shaft 8 of a flexible and resilient structure which is deformed radially. In this process the shaft 8 becomes sagged under the pressure acting thereon and its middle portion is displaced downward (according to the drawing). Displaced together with the shaft 8 is the body of the key 5 rigidly secured on this shaft and its pusher 16 is caused to move, thereby closing the contact pair 17. It is that very moment shown in FIG. 5 when the shaft 8 has become sagged and the key 5 has been displaced downward closing the contact pair 17. Upon removal of the external action, the flexible and resilient shaft 8 straightens out and the key similarly recovers its initial position, thereby opening the contact pair 17 and stopping the generation of the electric signal.

The operation of the switch means 10 shown in FIGS. 7 and 7*a* and comprising the wafers with the contacts does not differ substantially from the operation of the embodiment of this means shown in FIG. 8 and comprising the contacts coupled to the cams 48. Therefore, the process of generating electric signals representing the codes formed by the proposed keyboard will be described as applied to the switch means 10 made in the form of a wafer switch and shown in FIG. 9 together with the field of the contact pairs 17 and the keys 5.

The complete code of the characters assigned by the keyboard is formed in two stages. At the first stage by means of the rough channel 63 of forming the codes there are formed two higher-order digits of the complete code, the value of these higher-order digits being determined by the position of the movable contacts 36 and 41 of the wafer switch serving as the switch means 10. At the second stage by means of the accurate channel 55 of forming the codes there are formed five lower-order digits of the complete code. In this configuration as a logic "unit" is accepted the high potential or, otherwise, the positive level (+5 volts), while as a logic "zero" is accepted the low potential or, otherwise, the zero level (zero volts).

In the first position of the wafer switch the movable contacts 36 and 41 are closed respectively with its stationary contacts 37 and 42. Consequently, the low potential from the source 67 by the integrating line 64 and through the closed contact pairs 37, 36 and 42, 41 comes to be applied respectively to the input 68 of the logic AND element 69 and to the input 70 of the logic AND element 71.

If in this case there are closed, for example, the contact pair 17-29 of the contact field of the accurate channel 55, then a positive polarity pulse from the generator 58 by the common tying bus 56, through the closed contact pair 17-29 and over the separate conductor from this pair, is supplied to one of the inputs of the coder 59 which performs the conversion of the positional code of each of the contact pairs 17 to the five-digit binary code. At that, for the case when the contact pair 17-29 is closed, at the outputs 60*a*–60*e* of the coder 59 of the accurate channel 55 there is formed a code 11101 which, upon arriving at the inputs 62*a*–62*e* of the seven-unit binary register 61, is recorded in the cells of the five lower-order stages of this register. Concurrently therewith the positive pulses representing the logic "units" arrive from the outputs 60 of the coder 59 at the inputs 75 of the logic OR circuit 74 and, from the output of this circuit, at the parallel-connecting second inputs 72 and 73 of the logic AND elements 69 and 71. However, since the first input 68 and 70 of the logic AND elements 69 and 71 are placed under the low potential, as was mentioned hereinabove, then the positive pulses from the output of the logic OR circuit 74 will not pass through the logic AND elements 69 and 71 and will not arrive at the inputs 62*f* and 62*g* of the register 61; as a result of which the logic "units" represented by these pulses will not be recorded in the cells of the two higher-order stages of this register. Therefore, the register 61 will store a seven-digit code 0011101 which represents the code assigned on closing the contact pair 17-29.

If the wafer switch is switched over to the second position, then the contacts 36, 38 and 41, 43 are closed in pairs. As a result, the low potential from the source 67 by the integrating line 64 through the closed pair of the contacts 41, 43 is applied to the input 70 of the logic AND element 71, while the high potential from this source by the integrating line 65 and through the closed pair of the contacts 36, 38 is applied to the input 70 of the AND element 69. Thus, the AND element 69 will be prepared for passing the positive pulse. On closing the same contact pair 17-29 at the outputs 60 of the coder 59 of the accurate channel 55 there will be formed a code 11101 which is again recorded in the cells of the same five lower-order stages of the register 61. And again, concurrently therewith the positive pulses representing the logic "units" arrive from the outputs 60 of the coder 59 over the logic OR circuit 74 at the inputs 72 and 73 of the logic AND elements 69 and 71. But, in this case, the positive pulse arriving from the output of the logic OR circuit 74 at the inputs 72 and 73 of the logic AND elements 69 and 71 will pass through the element 69, and the logic "units" represented by this pulse will be recorded in the cell of one of the higher-order stages of the register 61. Consequently, in this case the register 61 will store the resulting code 0111101 which corresponds to the new character whose inscription appears in the aperture 2 (FIG. 1) on the key 5 after setting of the rotation member 9 and, thus, of the wafer switch to the second position. Similarly to the foregoing, there will be formed the codes of the characters also in the third and fourth positions of the rotation member 9. If at that one and the same key 5 is pressed and, consequently, one and the same contact pair 17 will be closed, then it is only the higher-order digits of the codes of the characters which, as described hereinabove, will be changed in accordance with the newly emerging inscriptions of the characters on this key, while the lower-order digits of the codes will remain invariable. But, if the rotation member 9 and, thus, the wafer switch is allowed to remain in any one position, while there will be pressed in succession different keys 5, then the higher-order digits in the complete seven-digit code of the characters will remain invariable and only the five lower-order digits of this code will change.

The major advantage of the data input keyboard according to the present invention, as compared to the prior art keyboards of the same purpose in which there are provided devices for changing the alphabet of the characters assigned and in which one and the same key is employed for assigning a few characters of different alphabets, is that in this keyboard, upon a change of the alphabet of the characters assigned, there are simultaneously altered the inscriptions of the characters on all the keys, and this comes about so that subsequent to setting of one or another chosen alphabet of the characters on the faces of all the keys visible to the operator there are found the inscriptions of only those characters which constitute this chosen alphabet. This facilitates and simplifies to a certain degree the job of the operator using the proposed keyboard since at the time of character assigning he does not need to remember what character alphabet he has set or to check the type of the character he is assigning by means of some auxiliary means. Thus, when using the proposed data input keyboard, there is avoided the need for continuous and attention-distracting choosing of one required character out of the few available on the key, which has been the common practice with the prior art keyboards; the operator in the course of operation simply pushes that key which carries the inscription of the character required for him. Such an advantage is highly important in a variety of cases and makes it possible to increase considerably the speed and reliability of data input into the computer system.

Hereinabove there have been described a few specific embodiments of the present invention allowing the introduction of various modifications, variations and additions which are perfectly apparent to those skilled in the art to which the invention appertains. Consequently, the present invention is not to be limited in the least by the foregoing description of the proposed data input keyboard and its separate elements, and a number of modifications, variations and additions render themself easily for introduction thereinto without departing from the spirit and scope of the invention defined by the following claims.

What is claimed is:

1. A data input keyboard comprising a panel, a plurality of keys arranged on said panel in the form of a matrix of "m" lines and "n" columns, each of said keys being provided with a resilient member, a pusher and a contact pair coupled to said pusher, said contact pairs of said keys defining an accurate channel of forming the codes of characters being assigned by the keyboard;

a switch means provided with a plurality of contact pairs, in each of which one of the contacts is movable, while the other is stationary, said contact pairs of said switch means defining a rough channel of forming the codes of said characters; and a rotation transfer mechanism provided with an input shaft with a rotation member and "m" output shafts, said rotation transfer mechanism being coupled to said contacts of said contact pairs of said switch means for switching said rough channel, each of said keys having the shape of a cylinder with faces on peripheral surfaces thereof carrying the inscriptions of said characters, each of said keys being capable of rotation about the longitudinal axis of the cylinder, said keys of the "m" lines of said matrix being mounted on one of said output shafts of said rotation transfer mechanism, and each of said keys being mounted on said output shaft of said rotation transfer mechanism to be capable of shifting towards its pusher.

2. A data input keyboard as defined in claim 1, wherein each of said keys comprises a hollow cylinder, each resilient member comprises two tapered helical springs, and each of said output shafts is rigid, said tapered helical springs being mounted inside said output shaft facing each other with the apexes thereof and each enclosing said output shaft, each of said tapered helical springs being rigidly secured with one portion thereof to said output shaft and with another portion thereof to the inner surface of said hollow cylinder.

3. A data input keyboard as defined in claim 1, wherein each of said keys comprises a cylinder with an axial through opening, and each of said output shafts is flexible and resilient and serves as said resilient member, each of said keys being rigidly secured on said flexible and resilient output shaft extending through said axial through opening of said cylinder.

4. A data input keyboard as defined in claim 1, wherein said switch means comprises a multipositional rotary switch having a rotary portion with said movable contacts of said contact pairs and a nonrotary portion with said stationary contacts of said contact pairs, said rotary portion being fitted on said input shaft of said rotation transfer mechanism, and said nonrotary portion being secured to said panel, said multipositional rotary switch having "p" positions and the number of directions being equal to the value of the square root of the value "p", rounded to an integer, "p" being the number of said faces of said key.

5. A data input keyboard as defined in claim 1, wherein said switch means comprises "p" cams, each of which being provided with a lobe, each of said cams being mounted on one of said output shafts to be capable of making contact by said lobe thereof with said movable contact of one of said contact pairs of said switch means, said lobes of two adjacent cams being displaced circumferentially with respect to each other by 360/p degrees, "p" being the number of said faces of said key.

6. A data input keyboard as defined in claim 2 wherein said switch means comprises a multipositional rotary switch having a rotary portion with said movable contacts of said contact pairs and a nonrotary portion with said stationary contacts of said contact pairs, said rotary portion being fitted on said input shaft of said rotation transfer mechanism, and said nonrotary portion being secured to said panel, said multipositional rotary switch having "p" positions and the number of directions being equal to the value of the square root of the value "p", rounded to an integer, "p" being the number of said faces of said key.

7. A data input keyboard as defined in claim 2 wherein said switch means comprises "p" cams, each of which being provided with a lobe, each of said cams being mounted on one of said output shafts to be capable of making contact by said lobe thereof with said movable contact of one of said contact pairs of said switch means, said lobes of two adjacent cams being displaceable circumferentially with respect to each other by 360/p degrees, "p" being the number of said faces of said key.

8. A data input keyboard as defined in claim 3, wherein said switch means comprises a multipositional rotary switch having a rotary portion with said movable contacts of said contact pairs and a nonrotary position with said stationary contacts of said contact pairs, said rotary portion being fitted on said input shaft of said rotation transfer mechanism, and said nonrotary portion being secured to said panel, said multipositional rotary switch having "p" positions and the number of directions being equal to the value of the square root of the value "p", rounded to an integer, "p" being the number of said faces of said key.

9. A data input keyboard as defined in claim 3, wherein said switch means comprises "p" cams, each of which being provided with a lobe, each of said cams being mounted on one of said output shafts to be capable of making contact by said lobe thereof with said movable contact of one of said contact pairs of said switch means, said lobes of two adjacent cams being displaced circumferentially with respect to each other by 360/p degrees, "p" being the number of said faces of said key.

* * * * *